US 10,830,516 B2

(12) United States Patent
Muthusubramanian

(10) Patent No.: US 10,830,516 B2
(45) Date of Patent: Nov. 10, 2020

(54) CONTROL SYSTEM FOR MULTIPLE COMPRESSORS

(71) Applicant: Emerson Climate Technologies, Inc., Sidney, OH (US)

(72) Inventor: Kamalakkannan Muthusubramanian, Troy, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 133 days.

(21) Appl. No.: 15/988,654

(22) Filed: May 24, 2018

(65) Prior Publication Data

US 2019/0063805 A1 Feb. 28, 2019

Related U.S. Application Data

(60) Provisional application No. 62/550,093, filed on Aug. 25, 2017.

(51) Int. Cl.
*F25B 49/02* (2006.01)
*F25B 31/02* (2006.01)
*F25B 41/00* (2006.01)
*F24F 11/86* (2018.01)

(52) U.S. Cl.
CPC .......... *F25B 49/022* (2013.01); *F24F 11/86* (2018.01); *F25B 31/02* (2013.01); *F25B 41/003* (2013.01); *F25B 2400/0751* (2013.01); *F25B 2600/025* (2013.01); *F25B 2600/0253* (2013.01); *F25B 2700/02* (2013.01); *F25B 2700/2104* (2013.01); *F25B 2700/2106* (2013.01)

(58) Field of Classification Search
CPC .......... F24F 11/86; F25B 31/02; F25B 49/022
USPC ....................................................... 62/228.1
See application file for complete search history.

(56) References Cited

U.S. PATENT DOCUMENTS

| | | | | |
|---|---|---|---|---|
| 5,062,276 | A * | 11/1991 | Dudley | F24F 11/00 62/176.6 |
| 6,269,650 | B1 * | 8/2001 | Shaw | F24F 11/83 62/176.6 |
| 10,215,436 | B1 * | 2/2019 | Rawski | F24F 11/86 |
| 2006/0156749 | A1 | 7/2006 | Lee et al. | |
| 2010/0107668 | A1 * | 5/2010 | Voorhis | F24F 3/153 62/176.3 |
| 2010/0247331 | A1 * | 9/2010 | Heinbokel | F04B 49/065 417/12 |
| 2015/0007595 | A1 * | 1/2015 | Karkhanis | F25B 49/022 62/115 |

(Continued)

OTHER PUBLICATIONS

International Search Report of the ISA/KR regarding International Application No. PCT/US2018/048005 dated Dec. 17, 2018.

(Continued)

*Primary Examiner* — Henry T Crenshaw
(74) *Attorney, Agent, or Firm* — Harness, Dickey & Pierce, P.L.C.

(57) ABSTRACT

A control system for controlling an output for a plurality of compressors includes a control unit receiving a first value from a first sensor and generating a first output based on the first value. The control unit receives a second value from a second sensor and derives a final output from the first output and the second value. A plurality of compressors receives the control commands from the control unit based on the final output.

26 Claims, 10 Drawing Sheets

(56) References Cited

U.S. PATENT DOCUMENTS

2015/0276291 A1* 10/2015 Pham ................. F24F 11/83
                                                    62/115
2016/0313041 A1* 10/2016 Pham ................ F25B 49/005
2018/0172305 A1*  6/2018 Son .................... F24F 11/86
2018/0252425 A1*  9/2018 Laughman ........ G05B 19/0426
2018/0306462 A1* 10/2018 Ito ....................... F24F 7/08
2018/0372386 A1* 12/2018 Cao .................. F25B 49/022

OTHER PUBLICATIONS

Written Opinion of the ISA/KR regarding International Application No. PCT/US2018/048005 dated Dec. 17, 2018.

* cited by examiner

| Number of Discrete Operating Modes | Fixed Capacity Compressors | Combination Fixed/2-Stage Compressors |
|---|---|---|
| Even Tandem | 2<br>(2 fixed capacity compressors) | 5<br>(1 2-stage and 1 fixed capacity) |
| Even Trio | 3<br>(3 fixed capacity compressors) | 8<br>(1 2-stage and 2 fixed capacity) |
| Uneven Tandem | 6<br>(2 fixed capacity compressors) | 8<br>(1 2-stage and 1 fixed capacity) |
| Uneven Trio | 7<br>(3 fixed capacity compressors) | 18<br>(1 2-stage and 2 fixed capacity) |

FIG. 3

| Position Compressor | A (83k BTU/hr) Two-Stage | B (76k BTU/hr) Fixed | C (91k BTU/hr) Fixed |
|---|---|---|---|
| 1 | 1 | 1 | 1 |
| 2 | -1 | 1 | 1 |
| 3 | 0 | 1 | 1 |
| 4 | 1 | 1 | 0 |
| 5 | -1 | 1 | 0 |
| 6 | 1 | 0 | 1 |
| 7 | -1 | 0 | 1 |
| 8 | 0 | 1 | 0 |
| 9 | 0 | 0 | 1 |
| 10 | 1 | 0 | 0 |
| 11 | -1 | 0 | 0 |

| KEY | |
|---|---|
| Full Load | 1 |
| Off | 0 |
| UT Modulated Load | -1 |

FIG. 4

| AY2 | 55 | 60 | 65 | 70 | 75 | 80 | 85 | 90 | 95 |
|---|---|---|---|---|---|---|---|---|---|
| BY2 | 45 | 40 | 35 | 30 | 25 | 20 | 15 | 10 | 5 |
| AY1 | 36.85 | 40.2 | 43.55 | 46.9 | 50.25 | 53.6 | 56.95 | 60.3 | 63.65 |
| BY1 | 30.15 | 26.8 | 23.45 | 20.1 | 16.75 | 13.4 | 10.05 | 6.7 | 3.35 |
| AY2 + BY2 | 100 | 100 | 100 | 100 | 100 | 100 | 100 | 100 | 100 |
| AY1 + BY1 | 67 | 67 | 67 | 67 | 67 | 67 | 67 | 67 | 67 |
| AY2 + BY1 | 85.15 | 86.8 | 88.45 | 90.1 | 91.75 | 93.4 | 95.05 | 96.7 | 98.35 |
| AY1 + BY2 | 81.85 | 80.2 | 78.55 | 76.9 | 75.25 | 73.6 | 71.95 | 70.3 | 68.65 |

FIG. 5

CONTROL SYSTEM FOR MULTIPLE COMPRESSORS

CROSS-REFERENCE TO RELATED APPLICATIONS

This application claims the benefit of U.S. Provisional Application No. 62/550,093, filed on Aug. 25, 2017. The entire disclosure of the above application is incorporated herein by reference.

FIELD

The present disclosure relates to a compressor control system, and, more particularly to a control system for multiple compressors that optimizes efficiency.

BACKGROUND

This section provides background information related to the present disclosure which is not necessarily prior art.

Compressors are used in a wide variety of industrial and residential applications to circulate refrigerant within a refrigeration, heat pump, HVAC, or chiller system (generically referred to as "refrigeration systems") to provide a desired heating and/or cooling effect. In any of the foregoing systems, the compressor should provide consistent and efficient operation to ensure that the particular refrigeration system functions properly.

Compressor systems may include multiple compressors connected together for increased efficiency and capacity modulation. The compressors have the capability to operate together or individually, delivering different capacity steps as needed. System capacity can be modulated by using multiple refrigeration circuits or by using multiple compressors in a single-circuit. For example, in a four compressor system, frequently used in packaged rooftops, individual compressors can be turned on and off or be set to different capacity levels to achieve different outputs.

Human comfort is achieved based on a variety of factors including, but not limited to, room temperature, relative humidity, clothing, etc. If the temperature is correct, but the relative humidity is too high, human comfort may not be achieved. Likewise, if the relative humidity is low, but the temperature is too low, human comfort may not be achieved. Current multiple compressor systems are focused on meeting a requested temperature, often overlooking other factors necessary for human comfort.

SUMMARY

This section provides a general summary of the disclosure, and is not a comprehensive disclosure of its full scope or all of its features.

A control system for controlling an output for a plurality of compressors includes a control unit receiving a first value from a first sensor and generating a first output based on the first value. The control unit receives a second value from a second sensor and derives a final output from the first output and the second value. A plurality of compressors receives the control commands from the control unit based on the final output.

The control system may further include a first value that is a temperature from a temperature sensor, a first output that is a sensible load request from a temperature correction unit, and a second value that is a relative humidity from a humidity sensor.

The control system may further include a control unit that is a relative humidity correction unit where the relative humidity correction unit provides a final output that is a latent load request. The relative humidity correction unit modifies a sensible load request based on a relative humidity to derive the latent load request.

The control system may further include a plurality of compressors that has a configuration with a uniform distribution of stages.

The control system may further include a plurality of compressors that has a configuration with a non-uniform distribution of stages.

The control system may further include a control unit that stages the compressors by operating the compressors at predetermined capacity levels corresponding to a sensible stage or one of a plurality of increased stages based on the sensible load request or the latent load request.

The control system may further include a control unit that commands the plurality of compressors to provide a capacity to meet an increased load corresponding to an increased stage from the sensible stage to overcool an environment and reduce relative humidity.

A control system for controlling a plurality of compressors includes a control unit that generates a sensible load request and a latent load request. A plurality of compressors receives the control commands from the control unit. The control unit commands the plurality of compressors to a first capacity based on the latent load request for a first predetermined time, and the control unit commands the plurality of compressors to a second capacity based on the sensible load request for a second predetermined time.

The control system may further include a first predetermined time that is 3 minutes and a second predetermined time that is 3 minutes.

The control system may further include a control unit that generates the sensible load request based on a temperature received from a temperature sensor.

The control system may further include a control unit that modifies the sensible load request based on a relative humidity received from a humidity sensor to generate the latent load request.

The control system may further include a control unit that commands the plurality of compressors to a first capacity and a second capacity, where the first capacity is greater than the second capacity.

The control system may further include a control unit that alternates between commanding the plurality of compressors to the first capacity based on the latent load request for the first predetermined time and commanding the plurality of compressors to the second capacity based on the sensible load request for the second predetermined time.

A method for controlling an output for a plurality of compressors includes receiving, by a controller, a first value from a first sensor; generating, by the controller, a first output from the first value; receiving, by the controller, a second value from a second sensor; generating, by the controller, a final output from the first output and the second value; staging the plurality of compressors based on one of the first output and the final output; and controlling, by the controller, a plurality of compressors based on one of the first output and the final output.

The method may further include receiving, by the controller, a temperature from a temperature sensor as the first value, a sensible load request from a sensible load algorithm as the first output, and a relative humidity from a humidity sensor as the second value.

The method may further include determining, by the controller, a latent load request as the final output and modifying, by the controller, the sensible load request based on the relative humidity to derive the latent load request.

The method may further include commanding, by the controller, the plurality of compressors to provide a capacity to meet an increased load corresponding to an increased stage from the sensible stage to overcool an environment and reduce relative humidity.

The method may further include a configuration of the plurality of compressors that has a uniform distribution of stages.

The method may further include a configuration of the plurality of compressors that has a non-uniform distribution of stages.

The method may further include controlling, by the controller, the plurality of compressors to a first capacity based on the first output for a first predetermined time; and controlling, by the controller, the plurality of compressors to a second capacity based on the final output for a second predetermined time, where the second capacity is greater than the first capacity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a chart illustrating a number of example operating modes for a variety of example compressor systems.

FIG. 4 is a table illustrating the possible operating modes for an example uneven trio compressor system.

FIG. 5 is a table of capacities for the different stages of an example multi-linked compressor system.

Corresponding reference numerals indicate corresponding parts throughout the several views of the drawings.

DETAILED DESCRIPTION

Example embodiments will now be described more fully with reference to the accompanying drawings.

Often, there are situations where an output must be driven as a function of more than one input condition. Sometimes, one of the inputs is the primary driver and the other inputs will induce a change to the output derived from the first input. Traditionally, this was handled by adjusting an output derived from the first input using a "Gain/Bias" to include the influence of the second input. However, the adjustment in the traditional method is done continuously at all time steps which can cause issues in some situations. The control system described below includes a pulse width modulation system that provides intermittent adjustment, rather than the traditional continuous adjustment.

An example circumstance where a control system providing intermittent adjustment is advantageous is when controlling a compressor system for human comfort. Human comfort is an output driven by inputs such as room temperature, relative humidity, clothing, etc. Studies (ASHRAE reports) show that humans are comfortable in 30-60% relative humidity. Additionally, moisture in the air should be controlled for biological concerns. For example, bacteria, viruses, fungi, mites, respiratory infections, allergic rhinitis, asthma, chemical interactions, and ozone production are all decreased in an optimum relative humidity zone of 30-60% humidity.

It may be advantageous to over-cool the environment to reduce or eliminate relative humidity, leading to enhanced human comfort. However, using the traditional continuous adjustment, over-cooling is more likely to be continuous, leading to greater discomfort. Thus, the intermittent adjustment control system described herein provides over-cooling for a small and reasonable time (for example, during a portion of a duty cycle), such that relative humidity is decreased or removed but the occupant in the environment does not feel cold. After the small and reasonable time, the adjustment is removed such that the compressor output delivers only the needed cooling (for example, during the remainder of the duty cycle). The pulse width modulation system essentially creates comfort in the ON cycle by removing relative humidity and maintains the comfort in the OFF cycle by maintaining the correct temperature.

Figure 1:
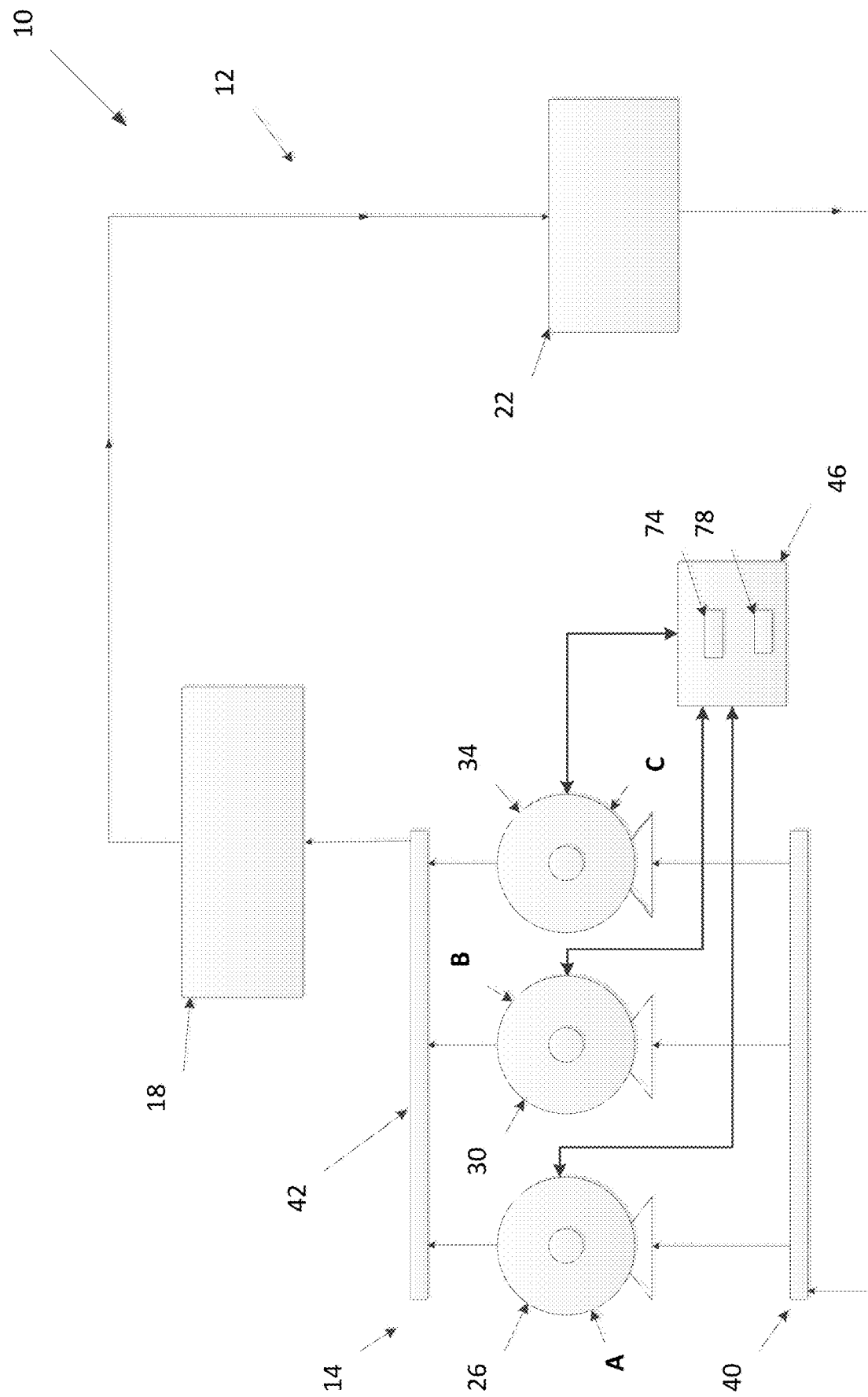
FIG. 1 is a schematic of a compressor system according to the present disclosure.

With reference to FIG. 1, a compressor system 10 is provided. The compressor system 10 may be used in conjunction with a heating, ventilation, and air conditioning (HVAC) system or refrigeration system 12 including at least one compressor or multiple linked or connected compressors 14, a condenser 18, and an evaporator 22. While the refrigeration system 12 is described and shown as including multi-linked compressors 14, the condenser 18, and the evaporator 22, the refrigeration system 12 may include additional and/or alternative components (for example only, only one compressor and an expansion device). Further, the present disclosure is applicable to various types of refrigeration systems including, but not limited to, heating, ventilating, air conditioning (HVAC), heat pump, refrigeration, and chiller systems.

During operation of the refrigeration system 12, the multi-linked compressors 14 circulate refrigerant generally between the condenser 18 and the evaporator 22 to produce a desired heating and/or cooling effect. Specifically, the multi-linked compressors 14 receive refrigerant in vapor form and compress the refrigerant. The multi-linked compressors 14 provide pressurized refrigerant in vapor form to the condenser 18.

All or a portion of the pressurized refrigerant received from the multi-linked compressors 14 may be converted into a liquid state within the condenser 18. Specifically, the condenser 18 transfers heat from the refrigerant to the surrounding air, thereby cooling the refrigerant. When the refrigerant vapor is cooled to a temperature that is less than a saturation temperature, the refrigerant changes state from a vapor to a liquid. The condenser 18 may include a condenser fan (not illustrated) that increases the rate of heat transfer away from the refrigerant by forcing air across a heat-exchanger coil associated with the condenser 18.

The refrigerant may pass through an expansion device (not illustrated) that expands the refrigerant prior to reaching the evaporator 22. The evaporator 22 may receive a mixture of vapor refrigerant and liquid refrigerant or purely liquid refrigerant from the condenser 18. The refrigerant absorbs heat in the evaporator 22. Accordingly, liquid refrigerant disposed within the evaporator 22 changes state from a liquid to a vapor when warmed to a temperature that is greater than or equal to the saturation temperature of the refrigerant. The evaporator 22 may include an evaporator fan (not illustrated) that increases the rate of heat transfer to the refrigerant by forcing air across a heat-exchanger coil associated with the evaporator 22.

As the liquid refrigerant absorbs heat, the ambient air disposed proximate to the evaporator 22 is cooled. The evaporator 22 may be disposed within a space to be cooled such as a building or refrigerated case where the cooling effect produced by the refrigerant absorbing heat is used to cool the space. The evaporator 22 may also be associated with a heat-pump refrigeration system where the evaporator 22 may be located remotely from the building such that the cooling effect is lost to the atmosphere and the rejected heat generated by the condenser 18 is directed to the interior of a space to be heated.

Figure 2:
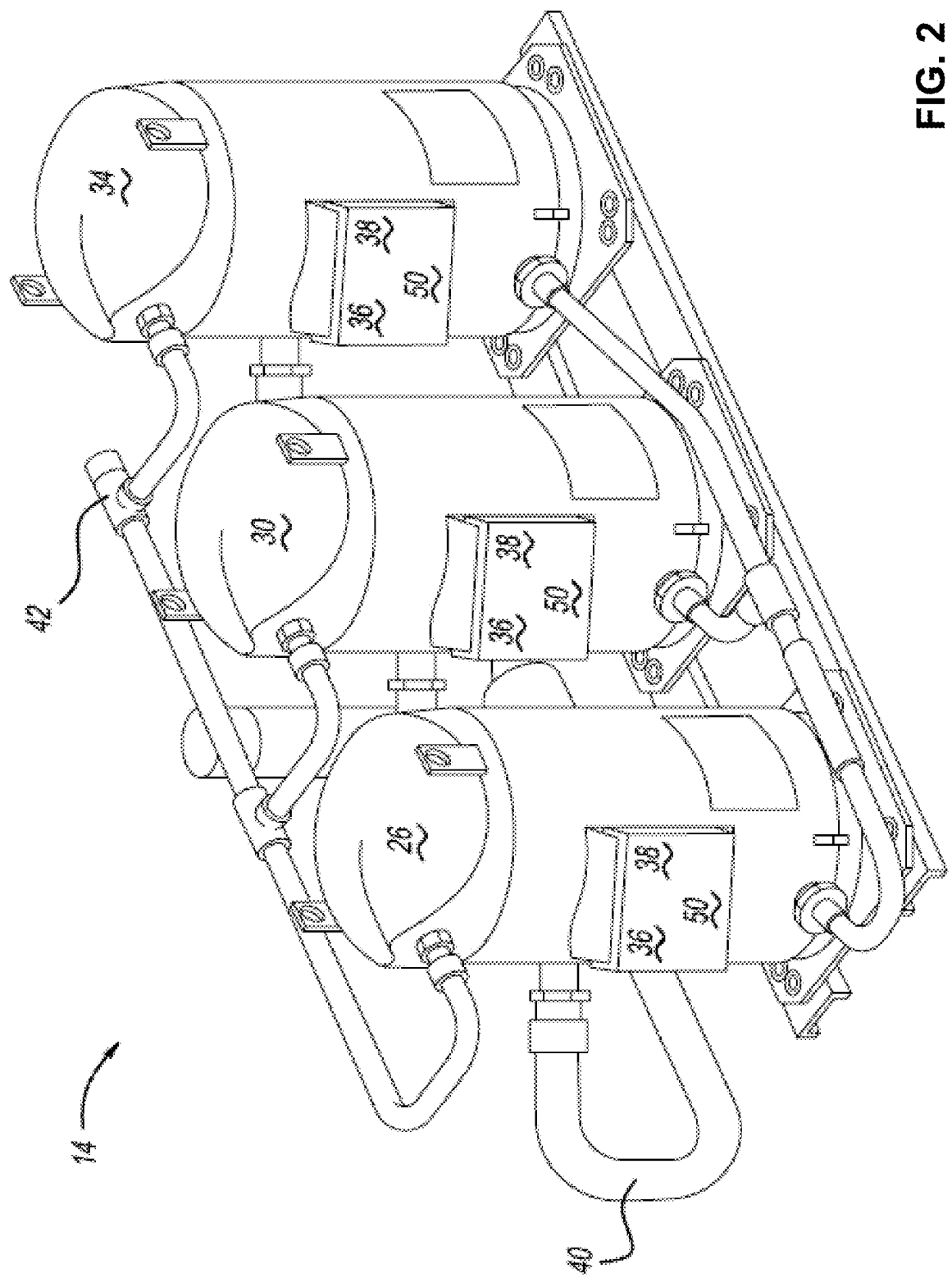
FIG. 2 is a perspective view of an example of multiple compressors of the compressor system of FIG. 1.

Referring additionally to FIG. 2, the multi-linked compressors 14 may further include two or more compressors 26, 30, 34 connected in parallel. Each of the compressors 26, 30, 34 of the multi-linked compressors 14 includes a plurality of solenoids 36 and contactors 38 that can be activated to control the compressor. For example only, the solenoids 36 and contactors 38 may be activated to run the compressor at full capacity or at a part capacity, where applicable. For example only, three compressors 26, 30, 34 are illustrated in FIGS. 1 and 2. While three compressors are illustrated and described, it is understood that any number of compressors may be included in the multi-linked compressors 14, including one compressor, two compressors, and more than three compressors. The compressors 26, 30, 34 share a single suction header or common suction line 40 and a single discharge header or common discharge line 42.

While a single circuit of multi-linked compressors is discussed and illustrated, it is understood that there may be multiple circuits in a single system. Each circuit in the system includes its own multi-linked compressors linked in tandem, trio, quad, or any other number. The circuits in a multi circuit system are independent but may run through a common evaporator and a common condenser. The output may be modulated by turning on the individual circuits separately or in combination with other circuits. Thus, the present disclosure is not limited to a single circuit of multi-linked compressors, but may be applied across any number of multiple circuits, each having multi-linked compressors.

The multi-linked compressors 14 may include one or more multi-stage compressors that are operable at multiple different capacity levels. Each of the compressors may be a scroll compressor, a reciprocating compressor, a screw compressor, a rotary compressor, a centrifugal compressor, or any other type of compressor. For example, a two-stage compressor operable at full capacity (or, in some embodiments, full scroll volume ratio) and at modulated capacity (in some embodiments, with a lower scroll volume ratio) can be used. The multi-stage compressor may utilize any manner of capacity modulation, including, but not limited to, two-step capacity modulation or continuous capacity modulation. Two-step capacity modulation is where the compressor runs at either a full capacity (for example, 100% capacity) or a part capacity (for example only, 67% capacity or any selected or programmed capacity), depending on cooling and/or heating demand. For example, two-step capacity modulation may be accomplished with a delayed suction system that modulates compressor capacity by venting an intermediate pressurized chamber to the suction chamber, as described in U.S. Pat. No. 6,821,092, the disclosure of which is incorporated herein by reference. With continuous capacity modulation, or variable valve modulation, the capacity of the compressor can be modulated from 10-100 percent so that the output precisely matches the changing cooling requirements of the space. For example, a bypass valve and passage can be used to continuously modulate compressor capacity, without changing the speed of the motor. For further example, continuous capacity modulation can be accomplished with a variable speed capacity modulation system that varies the speed of the compressor motor. The compressor motor speed determines the rate of refrigerant flow; thus, by varying the motor frequency, capacity can be modulated. Therefore, with a variable speed capacity modulation system, capacity output increases and decreases with motor speed. For further example, continuous capacity modulation can be accomplished with a scroll separation capacity modulation system. In a scroll separation capacity modulation system, capacity control is achieved by separating the scroll sets axially over a small period of time. For example, a scroll separation capacity modulation system is described in U.S. Pat. No. 6,213,731, which is incorporated herein by reference. In addition, any of the continuous capacity modulated systems can also be operated in two discrete capacity steps to accomplish two-step capacity modulation. A two-stage compressor, because of its capacity modulation, has three different operating, or power, modes: off, full capacity, and modulated, or reduced, capacity.

The multi-linked compressors 14 may include fixed capacity compressors. A fixed capacity compressor is a compressor having a traditional scroll design with a single, standard built-in volume ration (BIVR). The fixed capacity compressor has two different operating, or power, modes: off and full capacity.

The multi-linked compressors 14 may include variable volume ratio compressors. A variable volume ratio compressor incorporates a bypass passage to eliminate over compression losses by porting compressed fluid though a bypass valve in a fixed scroll of the compressor. The variable volume ratio compressor has three different operating, or power, modes: off, full BIVR and capacity, and reduced scroll volume ratio. The variable volume ratio compressor may be a passive scheme or any other scheme. While the variable volume ratio compressor may be a passive scheme in terms of control, the variable volume ratio compressor adds additional complexity by adapting scroll volume ratio to meet needs. In multi-linked compressors, knowing which compressors have variable volume ratio designs and selectively turning them on and off can influence the overall system efficiency. Variable volume ratio compressors may offer higher efficiency over a larger range of system pressures, as compared with a compressor having an optimized fixed pressure ratio or a traditional fixed pressure ratio. The pressure ratio is calculated as discharge pressure over suction pressure.

The multi-linked compressors 14 may be compressors linked in parallel in even multiples or uneven multiples. Even multiples are parallel compressors of the same BIVR and capacity; whereas uneven multiples are parallel compressors of different BIVR and/or capacities. The multi-linked compressors 14 may also incorporate one or more of the types of two-stage modulated capacity compressors, continuous capacity modulated compressors, and fixed capacity compressors.

Now referring to FIG. 3, examples of numbers of operating modes for various multi-linked compressor systems are shown. In some embodiments, the multi-linked compressors 14 may be an even tandem of fixed capacity compressors, meaning that the multi-linked compressors 14 may include two fixed capacity compressors having the same BIVR and capacity being linked in parallel. Because of the two operating modes (i.e., an ON mode and an OFF mode) for each of the two fixed capacity compressors, and the fact that the two fixed capacity compressors have the same BIVR and capacity, the even tandem of fixed capacity compressors has two total possible operating, or power, modes, excluding the operating mode where all compressors are off, i.e., the two operating, or power, modes being: (1) one compressor on; and (2) two compressors on.

In other embodiments, the multi-linked compressors 14 may be an even trio of fixed capacity compressors meaning that the multi-linked compressors 14 may include three fixed capacity compressors having the same BIVR and capacity being linked in parallel. Because of the two operating modes for each of the three fixed capacity compressors (i.e., ON mode and OFF mode), and the fact that the three fixed capacity compressors have the same BIVR and capacity, the even trio of fixed capacity compressors has three total possible operating, or power, modes, excluding the operating mode where all compressors are off, i.e., the three operating, or power, modes, being: (1) one compressor on; (2) two compressors on; and (3) three compressors on.

In other embodiments, the multi-linked compressors 14 may be an uneven tandem of fixed capacity compressors meaning that the multi-linked compressors 14 may include two fixed capacity compressors having different BIVR and capacities being linked in parallel. Because of the two operating modes (i.e., ON mode and OFF mode) for each of the two fixed capacity compressors, and the fact that the two fixed capacity compressors have different BIVR and capacities, the uneven tandem of fixed capacity compressors has three total possible operating, or power, modes, excluding the operating mode where all compressors are off, i.e., the three operating, or power, modes being: (1) lower capacity compressor on; (2) higher capacity compressor on; and (3) both compressors on.

In other embodiments, the multi-linked compressors 14 may be an uneven trio of fixed capacity compressors meaning that the multi-linked compressors 14 may include three fixed capacity compressors having different BIVR and capacities being linked in parallel. Because of the two operating modes (i.e., ON mode and OFF mode) for each of the three fixed capacity compressors, and the fact that the three fixed capacity compressors have different BIVR and capacities, the uneven trio of fixed capacity compressors has seven total possible operating, or power, modes, excluding the operating mode where all compressors are off, i.e., the seven operating, or power, modes being: (1) lowest capacity compressor on; (2) middle capacity compressor on; (3) highest capacity compressor on; (4) lowest and middle capacity compressors on; (5) lowest and highest capacity compressors on; (6) middle and highest capacity compressors on; and (7) all three compressors on.

In other embodiments, the multi-linked compressors 14 may be an even tandem of combination fixed and two-stage compressors, meaning that the multi-linked compressors 14 may include one two-stage compressor and one fixed capacity compressor, with both compressors having the same BIVR and capacity being linked in parallel. Because of the three operating modes for the two-stage compressor (i.e., HIGH capacity mode, LOW capacity mode, and OFF mode) and the two operating modes for the fixed capacity compressor (i.e., ON mode and OFF mode), and the fact that the two-stage and the fixed capacity compressors have the same BIVR and capacities, the even tandem of two-stage compressors has four total possible operating, or power, modes, excluding the operating mode where all compressors are off, i.e., the four operating, or power, modes being: (1) fixed capacity compressor on (or two-stage compressor on at high capacity); (2) two-stage compressor on at low capacity; (3) fixed capacity compressor on and two stage compressor on at low capacity; and (4) fixed capacity compressor on and two stage compressor on at high capacity.

In other embodiments, the multi-linked compressors 14 may be an even trio of combination fixed and two-stage compressors meaning that the multi-linked compressors 14 may include one two-stage compressor and two fixed capacity compressors having the same BIVR and capacity being linked in parallel. Because of the three operating modes (i.e., high capacity, low capacity, and OFF) for the two-stage compressor and the two operating modes (i.e., ON mode and OFF mode) for each of the fixed capacity compressors, and the fact that the two-stage and fixed capacity compressors have the same BIVR and capacity, the even trio of two-stage compressors has six total possible operating, or power, modes, excluding the operating mode where all compressors are off, i.e., the six operating, or power, modes being: (1) either fixed capacity compressor on (or two-stage compressor on at high capacity); (2) two-stage compressor on at low capacity; (3) one fixed capacity compressor on and two-stage compressor on at low capacity; (4) two fixed capacity compressors on (or one fixed capacity compressor and two-stage compressor on at high capacity); (5) two fixed capacity compressors on and two-stage compressor on at low capacity; and (6) two fixed capacity compressors on and two-stage compressor on at high capacity.

In other embodiments, the multi-linked compressors 14 may be an uneven tandem of combination fixed and two-stage compressors, meaning that the multi-linked compressors 14 may include one two-stage compressor and one fixed capacity compressor having different BIVR and capacities being linked in parallel. Because of the three operating modes (i.e., high capacity, low capacity, and OFF) for the two-stage compressor and the two operating modes (i.e., ON mode and OFF mode) for the fixed capacity compressor, and the fact that the two-stage and fixed capacity compressors have different BIVR and capacities, the uneven tandem of two-stage compressors has five total possible operating, or power, modes, excluding the operating mode where all compressors are off, the five operating, or power, modes being: (1) two-stage compressor on at low capacity; (2) fixed capacity compressor on (3) two-stage compressor on at high capacity; (4) fixed capacity compressor on and two-stage compressor on at low capacity; and (5) fixed capacity compressor on and two-stage compressor on at high capacity.

In other embodiments, the multi-linked compressors 14 may be an uneven trio of combination fixed and two-stage compressors, meaning that the multi-linked compressors 14 may include one two-stage compressor and two fixed capacity compressors having different BIVR and capacities being linked in parallel. Because of the three operating modes (i.e., high capacity, low capacity, and OFF) for the two-stage compressor and the two operating modes (i.e., ON mode and OFF mode) for each of the fixed capacity compressors, and the fact that the two-stage and fixed capacity tech compressors have different BIVR and capacities, the uneven trio of two-stage compressors has eleven total possible operating, or power, modes, excluding the operating mode where all compressors are off, the eleven operating, or power, modes being: (1) lower capacity fixed compressor on; (2) higher capacity fixed compressor on; (3) two-stage compressor on at low capacity; (4) two-stage compressor on at high capacity; (5) lower capacity fixed compressor on and higher capacity fixed compressor on; (6) lower capacity fixed compressor on and two-stage compressor on at low capacity; (7) lower capacity fixed compressor on and two-stage compressor on at high capacity; (8) higher capacity fixed compressor on and two-stage compressor on at low capacity; (9) higher capacity fixed compressor on and two-stage compressor on at high capacity; (10) lower capacity fixed compressor on, higher capacity fixed compressor on, and two-stage compressor on at low capacity; and (11) lower capacity fixed compressor on, higher capacity fixed compressor on, and two-stage compressor on at high capacity.

In other embodiments, the multi-linked compressors 14 may be a trio of uneven two-stage compressors comprising three two-stage compressors having different BIVR and capacities linked in parallel. Because of the three operating modes for each of the three two-stage compressors, and the fact that the two-stage compressors have different BIVR and capacities, the trio of two-stage compressors have twenty-six total possible operating, or power, modes, excluding the operating mode where all compressors are off, the twenty-six operating, or power, modes being: (1) lower capacity two-stage compressor on at high capacity; (2) lower capacity two-stage compressor on at low capacity; (3) middle capacity two-stage compressor on at high capacity; (4) middle capacity two-stage compressor on at low capacity; (5) higher capacity two-stage compressor on at high capacity; (6) higher capacity two-stage compressor on at low capacity; (7) lower and middle capacity two-stage compressors on at high capacity; (8) lower and middle capacity two-stage compressors on at low capacity; (9) lower capacity two-stage compressor on at high capacity and middle capacity two-stage compressors on at low capacity; (10) lower capacity two-stage compressor on at low capacity and middle capacity two-stage compressors on at high capacity; (11) lower and higher capacity two-stage compressors on at high capacity; (12) lower and higher capacity two-stage compressors on at low capacity; (13) lower capacity two-stage compressor on at high capacity and high capacity two-stage compressors on at low capacity; (14) lower capacity two-stage compressor on at low capacity and high capacity two-stage compressors on at high capacity (15) middle and higher capacity two-stage compressors on at high capacity; (16) middle and higher capacity two-stage compressors on at low capacity; (17) middle capacity two-stage compressor on at high capacity and high capacity two-stage compressors on at low capacity; (18) middle capacity two-stage compressor on at low capacity and high capacity two-stage compressors on at high capacity (19) lower, middle, and higher capacity two-stage compressors on at high capacity; (20) lower, middle, and higher capacity two-stage compressors on at low capacity; (21) lower and middle capacity two-stage compressors on at high capacity and higher capacity two-stage compressor on at low capacity; (22) lower and higher capacity two-stage compressors on at high capacity and middle capacity two-stage compressor on at low capacity; (23) middle and higher capacity two-stage compressors on at high capacity and lower capacity two-stage compressor on at low capacity; (24) lower and middle capacity two-stage compressors on at low capacity and higher capacity two-stage compressor on at high capacity; (25) lower and higher capacity two-stage compressors on at low capacity and middle capacity two-stage compressor on at high capacity; and (26) middle and higher capacity two-stage compressors on at low capacity and lower capacity two-stage compressor on a high capacity.

Now referring to FIG. 4, an example table illustrating the possible operating modes for an uneven trio compressor system having one two-stage compressor and two fixed compressors is shown. The total possible operating modes is determined based on the number of possible operating modes for each of the compressors and whether the compressors have the same or different BIVR and capacities. In the example embodiment, the uneven trio of two-stage compressors shown in FIG. 4 has one two-stage compressor (for example, a two-stage compressor with a 83,000 BTU/hr capacity) and two fixed capacity compressors with different BIVR and capacities (for example, a fixed capacity compressor with a 76,000 BTU/hr capacity and a fixed capacity compressor with a 91,000 BTU/hr capacity) being linked in parallel. With this combination of compressors, there are eleven total possible operating modes, depicted by the eleven rows in FIG. 4. Each possible operating mode is identified in FIG. 4. With reference to the Key, the two-stage compressor has the possibility of being off (0), at a full BIVR and capacity (1), or at a lower or modulated capacity (−1). Each of the fixed capacity compressors has the possibility of being off (0) or at full BIVR and capacity (1). Thus, the different combinations of compressor on/off/modulated modes are combined to make the total eleven possible operating modes, excluding the operating mode where all compressors are off.

While the fixed capacity even tandem, fixed capacity even trio, fixed capacity uneven tandem, fixed capacity uneven trio, two-stage even tandem, two-stage even trio, two-stage uneven tandem, and two-stage uneven trio are discussed above, it is understood that any combination of two-stage, multi-stage, fixed capacity, and variable valve compressors may be combined in parallel for the multi-linked compressors 14. The total number of possible operating modes for the multi-linked compressor 14 is determined based on the number of possible operating modes for each of the compressors and whether the compressors have the same or different full BIVR and capacities. Since the variable valve compressors offer operating modes for every level of capacity between 10 and 100%, the number of operating modes for a multi-linked compressor 14 including a variable valve compressor is infinite.

Now referring to FIG. 5, an example table of capacity levels or loads for the different stages of a multi-linked compressor system is illustrated. In the example table, the different stages of a multi-linked compressor system having a first two-stage compressor A and a second two stage compressor B, each with a low stage Y1 and a high stage Y2, is shown. The use of a pair of two-stage compressors in tandem provides eight capacity stages. The eight stages can be defined by the equations in the following table:

| 100% | 67 + 0.33Q | 100 − 0.33Q | Q | 67 | 0.67Q | 100 − Q | 67 − 0.67Q |
|---|---|---|---|---|---|---|---|

The existing eight stages may then be separated out, dedicating some of the stages for sensible load (discussed further below) and dedicating others of the stages for latent load demand (discussed further below).

In the table of FIG. 5, the top two rows, AY2 and BY2, list the load options for the high stages (Y2) of each compressor A and B. The sum of the AY2 and BY2 value in each column (as illustrated in the 5$^{th}$ row) is always 100. Thus, if the value for AY2 is Q, then the value for BY2 is 100-Q.

The next two rows, the third and fourth rows, list the load options for the low stages (Y1) of each compressor A and B. While the sum for the loads of the high stages of the compressors A and B must be 100, the sum for the loads of the low stages of the compressors A and B is not 100. Instead, the sum of the AY1 and BY1 value in each column (as illustrated in the 6$^{th}$ row) is always 67. While 67 is provided as an example part-capacity value in FIG. 5, it is understood that any part-capacity value may be used. Thus, if the value for AY1 is Q, then the value for BY1 is 67-Q.

The last two rows, the seventh and eighth rows, list the load options for combinations of the compressor A in high stage (AY2) and compressor B in low stage (BY1) (7$^{th}$ row) and the compressor A in low stage (AY1) and compressor B in high stage (BY2) (8$^{th}$ row).

As clearly shown in FIG. 5, there are redundant stages having the same or similar capacity levels in many of the combinations. For example, in the second column, there is an 85.15 and an 81.85 for AY2+BY1 and AY1+BY2, respectively. Similarly, there is a 30.15 and a 36.85, for BY1 and AY1, respectively. Because the capacity levels are similar, the original eight stages can be treated as six sensible stages and two latent stages. A sensible stage is used when only temperature is considered as a factor in requesting the compressor capacity. A latent stage is used when temperature and relative humidity are considered as factors in requesting the compressor capacity. Here, the 85.15 and 36.85 can become dedicated latent stages which will be run when latent loads are present and, simultaneously, the requested sensible capacity is in the vicinity of 80% or 30%. Similarly, the 81.85 and 30.15 can become dedicated sensible stages.

While the stages of the system are described for sensible and latent loads, it is understood that the present disclosure is not limited to the stages of the system. Additionally, circuits of a multi-circuit system may be treated the same as the stages, with certain circuits or certain circuit combinations used for sensible load and certain other circuits used for latent load.

Figure 6:
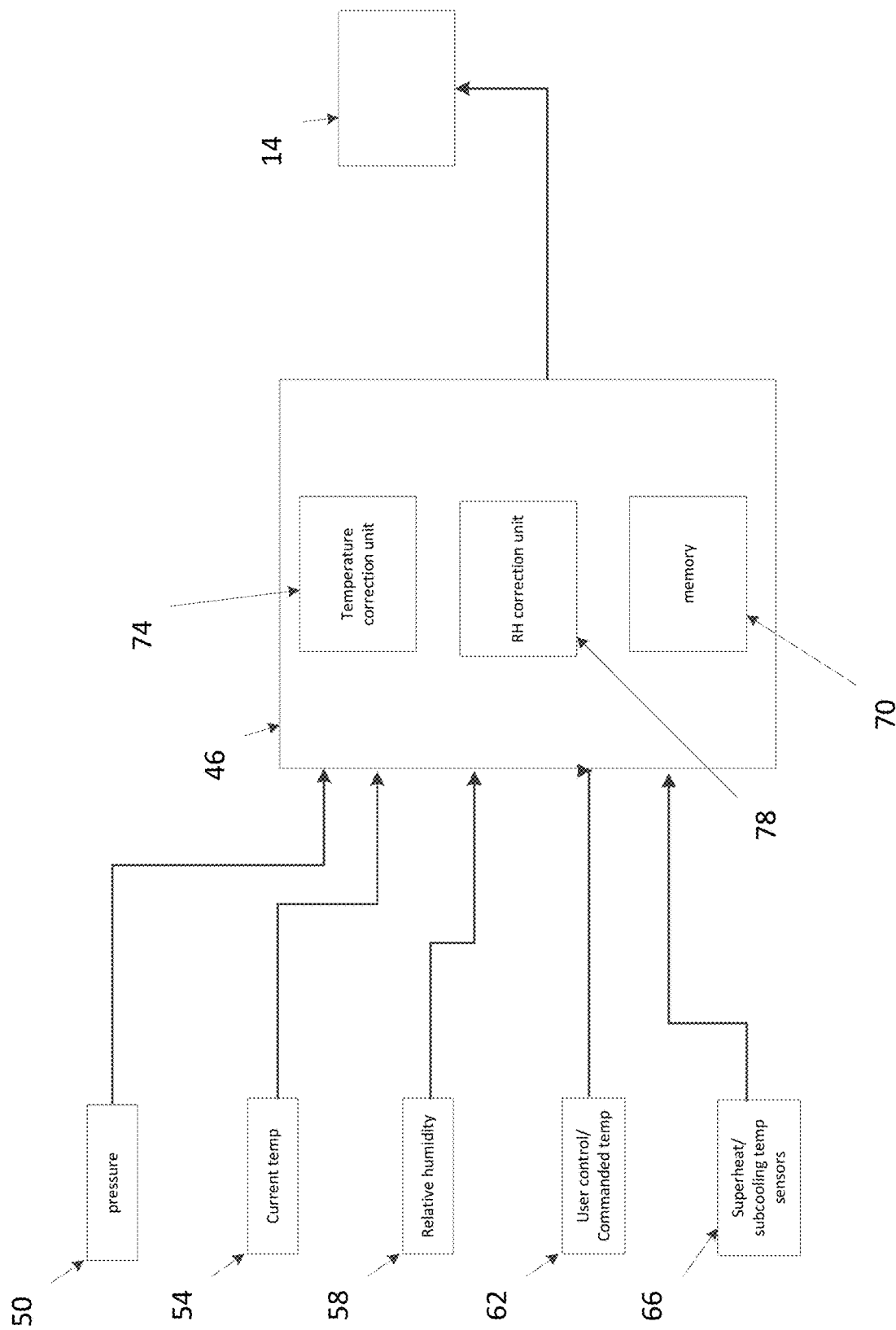
FIG. 6 is a schematic of a control system for the compressor system of FIG. 1.

Referring to FIGS. 1, 2, and 6, a system controller 46 may be associated with the compressor system 10 and/or the multi-linked compressors 14 and may command start up, stabilization, shut down, more capacity, and less capacity for each of the multi-linked compressors 14 and/or the refrigeration system 12 based on multiple inputs (for example, a commanded temperature, a current temperature, a relative humidity, a pressure, a superheat temperature, a subcooling temperature, etc.). The system controller 46 may be the physical controller for the multi-linked compressors 14 or may be software residing on the electronics.

The system controller 46 may utilize a series of sensors to determine both measured and non-measured operating parameters of the compressor 14 and/or the refrigeration system 12. While the system controller 46 is shown as being associated with the multi-linked compressors 14, the system controller 46 could be located anywhere within or outside of the refrigeration system 12. The system controller 46 may use the non-measured operating parameters in conjunction with the measured operating parameters to command start up, stabilization, shut down, more capacity, and less capacity for each of the multi-linked compressors 14 and/or the refrigeration system 12.

The system controller 46 may receive a pressure from a pressure sensor 50, a current temperature from an ambient temperature sensor 54 (for example, the current temperature may be an indoor temperature, a supply air temperature, a return air temperature, an outdoor temperature, etc.), a relative humidity from a humidity sensor 58, and a commanded temperature from a user control 62 (for example, a thermostat, a connected mobile device, or another device providing a commanded temperature), for example. The system controller 46 may also receive operating conditions of the compressor, such as a superheat temperature (Tsuper) and a subcooling temperature (Tsub). The superheat temperature and subcooling temperature may be directly sensed from temperature sensors 66 or may be calculated from other system parameters.

The capacities for the different stages for each compressor in the multi-linked compressors 14 are stored in the memory 70. For example, referring additionally to FIG. 5, if the multi-linked compressors include a first two-stage compressor in the A position and a second two-stage compressor in the B position, each having a low stage Y1 and a high stage Y2, the various capacities in the chart in FIG. 5 will be stored within the memory 70.

The system controller 46 may receive a first value and a second value and generate an output based on the first and second values. For example, in a case of human comfort control, the first value may come from a temperature correction unit 74 and the second value may come from the relative humidity sensor 58. A relative humidity correction unit 78 may receive the first value and the second value and may determine a desired compressor capacity for the compressors 14.

The temperature correction unit 74 may receive a signal indicating the current temperature from the ambient temperature sensor 54 and a signal indicating a commanded temperature from the user control 62. The temperature correction unit 74 compares the current temperature to the commanded temperature, and if the difference is greater than a predetermined temperature threshold (for example only, 2 degrees), the temperature correction unit 74 generates a sensible load request for the compressors 14. In an alternative embodiment, the temperature correction unit 74 may generate the sensible load request based on return air temperature. In this embodiment, the temperature correction unit 74 compares the return air temperature to the commanded temperature, and if the difference is greater than a predetermined temperature threshold (for example only, 2 degrees), the temperature correction unit 74 generates a sensible load request for the compressors 14.

The sensible load request is the load request that considers temperature as its only factor. The sensible load request may be based on, for example, ambient temperature and a setpoint temperature. For example, the sensible load request may be based on a comparison of, and a difference between an ambient temperature and a setpoint temperature.

The relative humidity correction unit 78 receives the sensible load request from the temperature correction unit 74 and a signal indicating relative humidity from the humidity sensor 58. If the relative humidity is greater than or equal to a humidity threshold (for example only, 60% humidity) or within a predetermined humidity range (for example only, 60-100% humidity), the relative humidity correction unit 78 generates a latent load request. The purpose of the latent load request is to modify the sensible load request with the intent to remove moisture from air and bring the relative humidity into a specified comfort level.

The latent load request is the load request that takes into account temperature and humidity. The latent load request may be determined from values, such as the values in FIG. 5. The latent load request may be a load request equal to the stage provided by the sensible load request plus one capacity step. For example, if the sensible load request from the temperature correction unit 74 is 81.85 in the chart in FIG. 5, the latent load request may be 85.15. Similarly, if the sensible load request is 30.15, the latent load request may be 36.85 (FIG. 5). The latent load request may not always be the same compressor capacity bump or increase, such as a compressor speed bump or increase, in the case of a variable speed compressor. The bump may be different based on the relative humidity. For example, in some embodiments, the bump may be greater the higher the relative humidity (i.e., the closer the relative humidity is to 100%).

The system controller 46 takes the latent load request provided by the relative humidity correction unit 78 and the data stored in the memory 70 and determines a load request for each compressor in the multi-linked compressors 14. Again, using the example chart in FIG. 5, if the latent load request is 85.15, the system controller 46 will command the first two-stage compressor in position A to a high stage and will command the second two-stage compressor in position B to a low stage. Similarly, if the latent load request is 36.85, the system controller 46 will command the first two-stage compressor in position A to a low stage and will command the second two-stage compressor in position B to off. The system controller 46 then sends the signal commands to the multi-linked compressors 14.

The system controller may operate the multi-linked compressors 14 according to a duty cycle. For example, the duty cycle may be a 6 minute cycle, with an ON portion of 3 minutes and an OFF portion of 3 minutes. The system controller 46 may maintain the multi-linked compressors 14 at the commanded capacity level (secondary output) for a predetermined time when the duty cycle is ON. During the OFF portion of the duty cycle, the system controller 46 will ignore the secondary output and maintain the multi-linked compressors 14 at a commanded capacity level (primary output) which is a function of the commanded temperature from the user control 62 and the current temperature from the ambient temperature sensor 54. Once the predetermined time is met, the system controller may reevaluate the primary (i.e. sensible load) and secondary (i.e. latent load or relative humidity) conditions.

Figure 7:
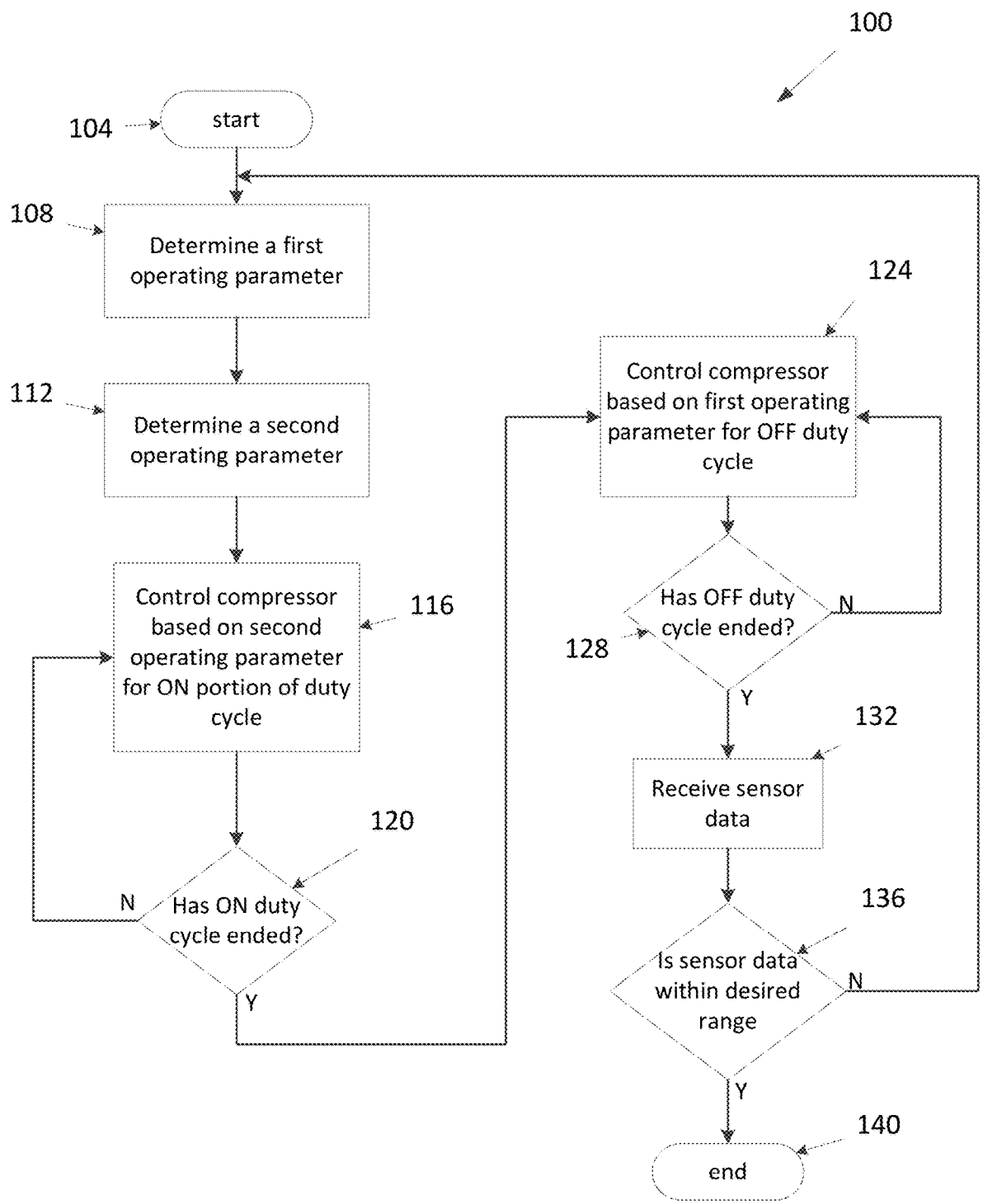
FIG. 7 is a flow chart illustrating steps for operating the compressor system of FIG. 1.

Now referring to FIG. 7, a flow chart for a method 100 of control based on a first operating parameter and a second operating parameter is illustrated. The method 100 may be carried out by the system controller 46 in FIG. 6. The method 100 starts at 104. At 108, the system controller determines the first operating parameter. The first operating parameter may be a primary output. The first operating parameter may be, for example, based on a temperature such as ambient, superheat, or subcooling, a pressure, a humidity, etc., which is determined from a sensor signal. The first operating parameter may also be an output from an algorithm, such as, for example, a compressor capacity request based on an ambient temperature or an intake air temperature and a set temperature. For example only, the first operating parameter may be output from the temperature correction unit 74 of system controller 46, as previously described in relation to FIG. 6. In the example, the first operating parameter may be a sensible load request.

At 112, the system controller 46 determines a second operating parameter. The second operating parameter may be, for example, based on a temperature such as ambient, superheat, or subcooling, a pressure, a humidity, etc. The second operating parameter may also be an output from an algorithm, such as, for example, a compressor capacity request based on an ambient temperature or an intake air temperature and a set temperature, or an algorithm, such as, for example, a compressor capacity request based on an ambient temperature, an intake air temperature, a relative humidity, a pressure, etc., and a sensible load request. For example, the second operating parameter may be output from the RH correction unit 78 of system controller 46, as previously described in relation to FIG. 6. In the example, the second operating parameter may be a latent load request.

At 116, the system controller 46 controls the compressor 26, 30, 34 based on the second operating parameter for an ON portion of a duty cycle. For example, the duty cycle may be a 6 minute cycle, with an ON portion of 3 minutes and an OFF portion of 3 minutes. If, for example, the first operating parameter is a commanded sensible load from a compressor load algorithm and the second operating parameter is a commanded latent load based on a relative humidity from a humidity sensor and the sensible load, the system controller 46 may provide a signal to a compressor to run the latent load for the 3 minute ON portion of the 6 minute duty cycle. For further example, in relation to FIG. 5, during the ON portion of the duty cycle, the system controller 46 may command the first compressor to run in HIGH stage (AY2) and the second compressor to run in LOW stage (BY1) to give a capacity output of 85.15 to decrease the relative humidity in the cooled space. During the OFF portion of the duty cycle, the system controller 46 may command the first compressor to run in LOW stage (AY1) and the second compressor to run in HIGH stage (BY2) to give a capacity output of 81.85 to maintain the temperature in the cooled space.

At 120, the system controller 46 determines whether the ON duty cycle has ended. If the ON duty cycle has not ended, method 100 returns to 116. If the ON duty cycle has ended at 120, the system controller 46 ignores the second operating parameter and controls the compressor based on the first operating parameter for the OFF duty cycle at 124. As previously stated, the duty cycle may be a 6 minute cycle, with an ON portion of 3 minutes and an OFF portion of 3 minutes. If, for example the first operating parameter is a commanded sensible load from a compressor load algorithm, the system controller 46 may provide a signal to a compressor to run the commanded sensible load for the 3 minute OFF portion of the 6 minute duty cycle (ignoring the commanded latent load which may be the second operating parameter from above).

At 128, the system controller 46 determines whether the OFF duty cycle has ended. If the OFF duty cycle has not ended, method 100 returns to 124. If the OFF duty cycle has ended at 128, sensor data is received at 132. Sensor data may be, for example, a temperature such as ambient, superheat, or subcooling, a pressure, a humidity, etc. For example only, the sensor data may be similar to pressure 50, current temperature 54, relative humidity 58, or superheat or subcooling temperature 66 as previously described in relation to FIG. 6. The system controller 46 re-evaluates the first operating parameter and the second operating parameter (for example, the sensible and latent conditions) from the sensor data received at 128.

At 136, the system controller 46 determines whether the sensor data is within the desired range, indicating that the conditions driving the first operating parameter and the second operating parameter have met the desired values (for example, the set temperature and/or the desired relative humidity). For example only, if the sensor data is a temperature of the cooled space, the desired range may be ±1° F. from the set temperature, and if the sensor data is a relative humidity, the desired range may be 30%-60% humidity. If the sensor data is not within the desired range, the method returns to 108. If the sensor data is within the desired range at 136, the method ends at 140.

Figure 8:
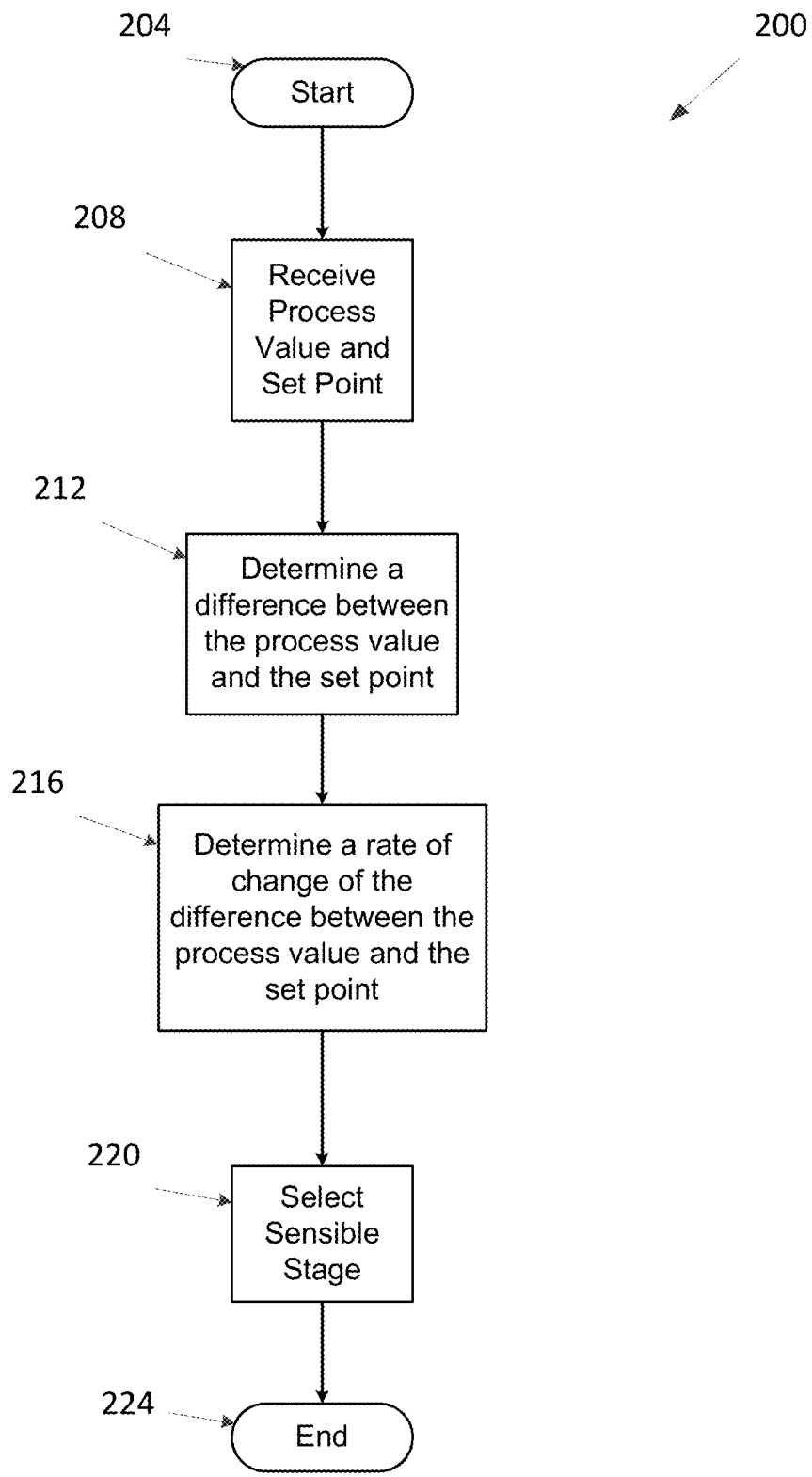
FIG. 8 is another flow chart illustrating steps for operating the compressor system of FIG. 1.

Referring to FIG. 8, an example embodiment for a method 200 of generating an output based on a process value and a set point is illustrated. Method 200 may be performed by system controller 46. For example, the RH correction unit (as previously described in relation to FIG. 6) in system controller 46 may perform the method 200. In an example embodiment, the method 200 may generate the first operating parameter in FIG. 7 or may be incorporated into the method 400 in FIG. 10 (described below). The method 200 starts at 204. At 208, the system controller 46 receives a process value and a set point. For example, the process value may be a temperature, such as an indoor or outdoor ambient temperature, a pressure, or another input. The set point may be a temperature, pressure, or other value provided as a user input into a device or mobile connection. The set point may be provided in the same units as the process value or may be converted into the same units by the system controller 46.

At 212, the system controller 46 determines a difference between the process value and the set point. The process value and the set point are either provided in the same units or are converted to be in the same units, so the difference may be determined by subtracting the process value from the set point or subtracting the set point from the process value.

At 216, the system controller 46 determines a rate of change of the difference between the process value and the set point. The process value is a value that is continuously received by the system controller. By subtracting each received process value from the set point (or vice-versa), the rate of change in the difference between the process value and the set point over a period of time is determined.

At 220, the system controller 46 generates a sensible stage based on the difference between the process value and the set point and the rate of change of the difference between the process value and the set point. For example only, this may be the output of the temperature correction unit 74 in the system controller 46 as previously described. The method 200 ends at 224.

Figure 9:
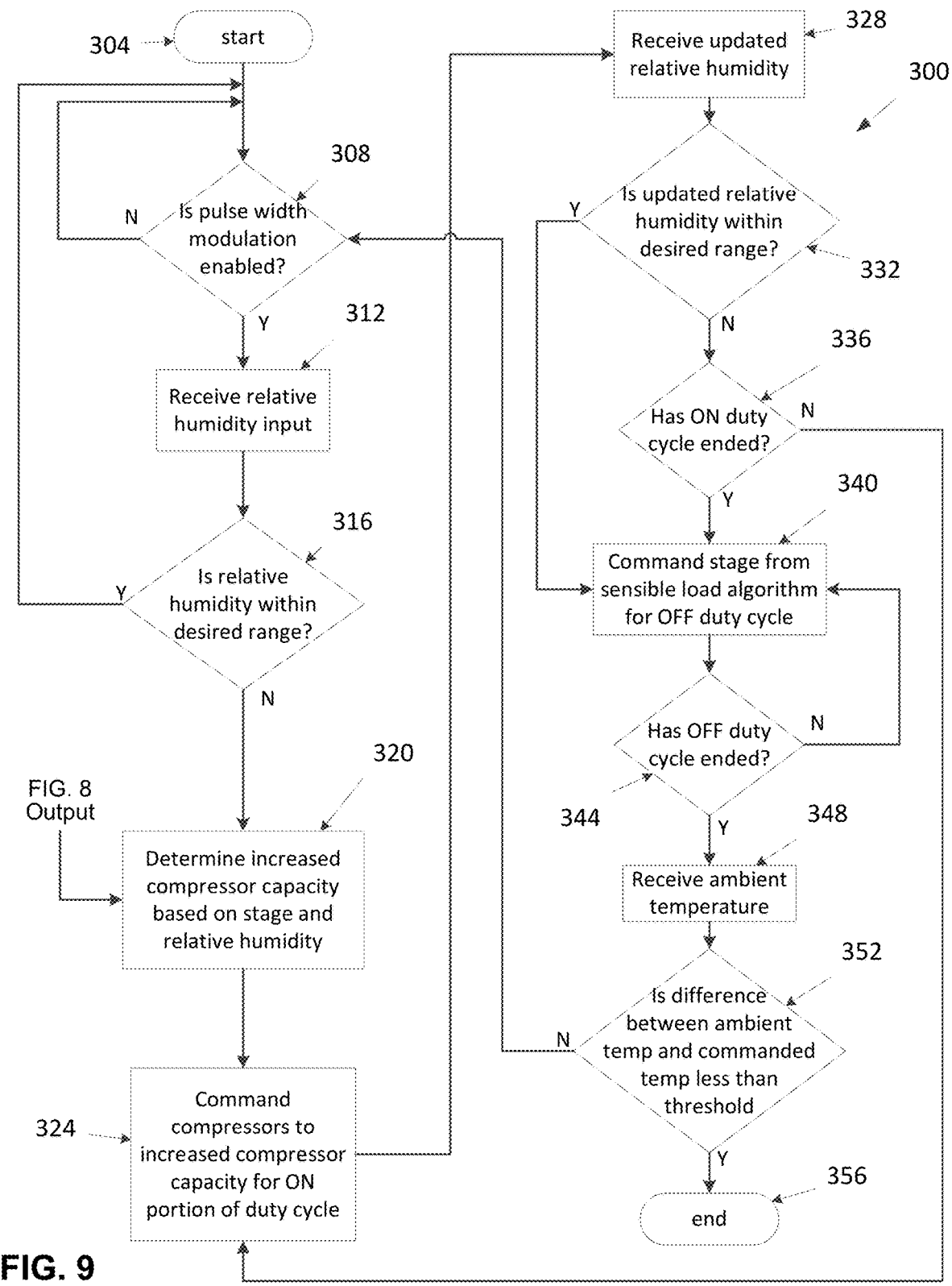
FIG. 9 is another flow chart illustrating steps for operating the compressor system of FIG. 1.

Now referring to FIG. 9, a method 300 for controlling a compressor is illustrated. For example, FIG. 9 provides the details of the configuration of the system controller 46 for using the outputs of the temperature correction unit 74 and RH correction unit 78 (as previously described in relation to FIG. 6) to generate the final output of the system controller 46. The method starts at 304. At 308, the method 300 determines whether pulse width modulation is enabled.

The homeowner may be able to enable humidity control by activating an enable button. Further, a supplier may be able to enable or disable functions in the control system software 46, one of which being the humidity control function. If pulse width modulation for the humidity control function is not enabled at 308, the method 300 returns to 308, and the method 300 is not utilized (for example, the compressors are controlled using only a sensible load request). If the pulse width modulation for the humidity control function is enabled at 308, the system controller 46 receives a relative humidity from the humidity sensor 58 at 312.

At 316, the system controller 46 determines whether the relative humidity is within a desired range. For example only, the desired range may be less than 60% humidity, and more specifically, may be within 30%-60% humidity. If the relative humidity is within the desired range, the method 300 returns to 308, and the method 300 is not utilized (for example, the compressors are controlled using only a sensible load request). If the relative humidity is outside of the desired range, the system controller 46 determines a latent load, or increased compressor capacity, based on the sensible stage or sensible load determined in FIG. 8 and the relative humidity at 320. It is noted that each of the processes illustrated in FIGS. 8 and 9 may run in parallel, with the process in FIG. 8 continually providing a sensible load to 320.

The latent load may be determined from a latent load algorithm. For example only, the latent load may be an output from the RH correction unit 78 in the system controller 46, as previously described in relation to FIG. 6. The latent load may be determined from values, such as the values in FIG. 5. The latent load request may be a load request equal to the stage provided by the sensible load request plus one capacity step. For example, if the sensible load request from the temperature correction unit 74 is 81.85 in the chart in FIG. 5, the latent load request may be 85.15. Similarly, if the sensible load request is 30.15, the latent load request may be 36.85 (FIG. 5). The latent load request may not always be the same compressor speed bump. The bump may be different based on the relative humidity. For example, the bump may be greater the higher the relative humidity (i.e., the closer the relative humidity is to 100%).

In some embodiments, the latent load request determined at 320 may be the second operating parameter in FIG. 7 or may be incorporated into FIG. 10 (described below).

At 324, the system controller 46 commands the compressors 14 to the latent load request for an ON portion of a duty cycle. For example, the duty cycle may be a 6 minute cycle, with an ON portion of 3 minutes and an OFF portion of 3 minutes.

At 328, an updated relative humidity is received. At 332, the system controller 46 determines whether the updated relative humidity is within a desired range. For example, the desired range may be within 30%-60% humidity. The desired range may be the same as the previously discussed desired range at 316. If the relative humidity is within the desired range, the system controller 46 commands the compressors 14 to the sensible load request for the OFF duty cycle at 340. If the relative humidity is not within the desired range at 332, the system controller 46 determines whether the ON duty cycle has ended at 336.

If the ON duty cycle has not ended at 336, method 300 returns to 324. If the ON duty cycle has ended at 336, the system controller 46 commands the compressors 14 to the sensible load request for the OFF duty cycle at 340. The duty cycle may be a 6 minute cycle, with an ON portion of 3 minutes and an OFF portion of 3 minutes.

At 344, the system controller 46 determines whether the OFF duty cycle has ended. If the OFF duty cycle has not ended, method 300 returns to 340. If the OFF duty cycle has ended at 344, an ambient temperature is received at 348. In alternative embodiments, an intake air temperature may be received at 348.

At 352, the system controller 46 determines whether a difference between the ambient temperature (or intake air temperature) and a commanded temperature (from the user control 62) is less than a threshold difference. For example, the threshold difference may be 2°. If the temperature difference is not less than the threshold difference, the method 300 returns to 308. If the temperature difference is less than the threshold difference at 352, the method 300 ends at 356.

Figure 10:
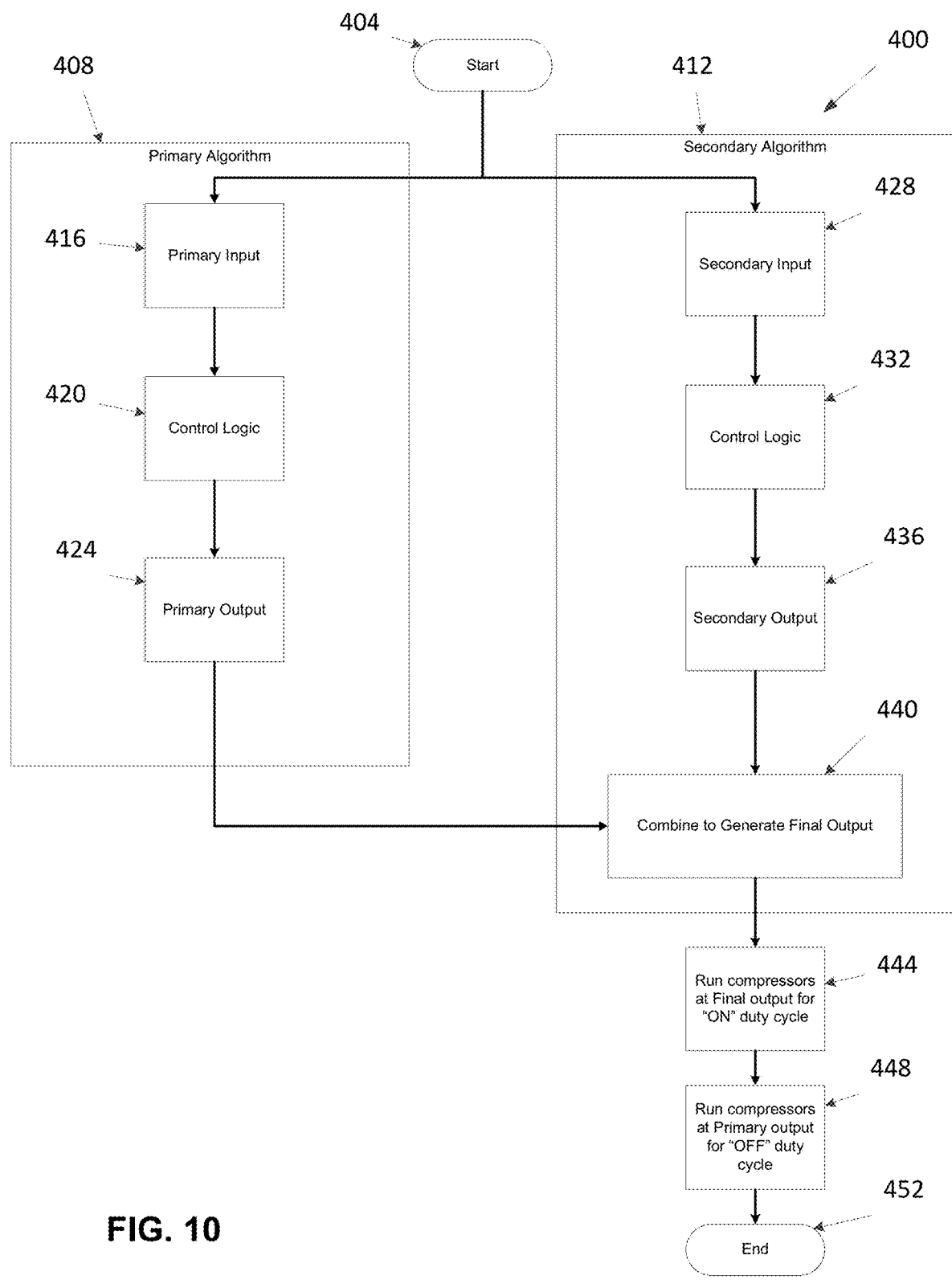
FIG. 10 is another flow chart illustrating steps for operating the compressor system of FIG. 1.

Now referring to FIG. 10, an example method 400 incorporating the processes described in FIGS. 7-9 is illustrated. FIG. 10 provides a high level representation of the methods in FIGS. 7-9. Method 400 starts at 404. A primary algorithm 408 and a secondary algorithm 412 run simultaneously to generate a primary output and a final output. For example, the primary algorithm 408 and the secondary algorithm 412 may be separate processing threads executed simultaneously by a single processor or processing module. For example, the primary algorithm 408 and the secondary algorithm 412 may be separate processing threads performed simultaneously by a single processor of the system controller 46 in parallel. Alternatively, the primary algorithm 408 and the secondary algorithm 412 may be separately executed by different processors or processing modules. For example, the system controller 46 may include separate processors or processing modules to separately execute the primary algorithm 408 and the secondary algorithm 412 in parallel. For further example, the compressor system 10 may include the system controller 46 that executes one of the primary algorithm 408 and the secondary algorithm 412 and may include an additional controller or control module that executed the other of the primary algorithm 408 and the secondary algorithm 412. For further example, the temperature correction unit 74 in the system controller 46 may execute the primary algorithm 408 and the RH correction unit 78 in the system controller 46 may execute the secondary algorithm 412.

At 416, method 400 receives a primary input. At 420, method 400 executes control logic, as discussed above. At 424, method 400 generates a primary output, as discussed above. The process illustrated in FIG. 8 is an example of the primary algorithm 408, with the sensible load in FIG. 8 being equivalent to the primary output in FIG. 10.

At 428, method 400 receives a secondary input. Method 400 runs control logic at 432, as discussed above. At 436, method 400 generates a secondary output, as discussed above. At 440, method 400 combines the primary output from 424 and the secondary output from 436 to generate a final output. The latent load in FIG. 9 is an example of the final output in FIG. 10. Further, the process in FIG. 9 is an example of the secondary algorithm in FIG. 10.

Additionally, in some embodiments, the secondary algorithm 412 may be selectively enabled or disabled. For example, the secondary algorithm 412 may be selectively enabled or disabled by a user. For example, user input may be received via a thermostat, a connected mobile device, or another connected device to selectively enable or disable the secondary algorithm 412. When the secondary algorithm 412 is disabled, the primary output generated at 424 is outputted at 440 as the final output. In other words, when the secondary algorithm 412 is disabled, the primary output is not modified by the secondary algorithm 412 and is output at 440 as the final output.

At 444, method 400 operates the compressors according to the final output from 440 for an "ON" portion of a duty cycle. At 448, method 400 operates the compressors according to the primary output from 424 for an "OFF" portion of the duty cycle. The method ends at 452.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In this application, including the definitions below, the terms controller, module, or unit may be replaced with the term circuit. The terms controller, module, or unit may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A control system comprising:
a controller configured to receive a first value from a first sensor and configured to generate a first output based on the first value, the controller being configured to receive a second value from a second sensor and being configured to generate a final output from the first output and the second value,
a plurality of compressors is configured to receive control commands from the controller based on one of the first output and the final output,
wherein the controller is configured to stage the plurality of compressors based on the one of the first output and the final output,
the controller is configured to control the plurality of compressors to a first capacity based on the first output for a first predetermined time, and
the controller is configured to control the plurality of compressors to a second capacity based on the final output for a second predetermined time, the second capacity being greater than the first capacity.

2. The control system of claim 1, wherein the first value is a temperature received from a temperature sensor, the first output is a sensible load request generated by the controller, and the second value is a relative humidity received from a humidity sensor.

3. The control system of claim 2, wherein the final output is a latent load request, the controller being configured to modify the sensible load request based on the relative humidity to derive the latent load request.

4. The control system of claim 3, wherein a configuration of the plurality of compressors has a uniform distribution of stages.

5. The control system of claim 3, wherein a configuration of the plurality of compressors has a non-uniform distribution of stages.

6. The control system of claim 3, wherein the controller is configured to stage the compressors by operating the compressors at predetermined capacity levels corresponding to a sensible stage or one of a plurality of increased stages based on the sensible load request or the latent load request.

7. The control system of claim 6, wherein the controller is configured to command the plurality of compressors to provide a capacity to meet an increased load request corresponding to an increased stage from the sensible stage to overcool an environment and reduce relative humidity.

8. A control system for controlling a plurality of compressors, said control system comprising:
a controller configured to generate a sensible load request and a latent load request; and
a plurality of compressors receiving control commands from the controller,
wherein the controller is configured to command the plurality of compressors to a first capacity based on the latent load request for a first predetermined time and the controller is configured to command the plurality of compressors to a second capacity based on the sensible load request for a second predetermined time.

9. The control system of claim 8, wherein the first predetermined time is 3 minutes and the second predetermined time is 3 minutes.

10. The control system of claim 8, wherein the controller is configured to generate the sensible load request based on a temperature received from a temperature sensor.

11. The control system of claim 8, wherein the controller is configured to modify the sensible load request based on a relative humidity received from a humidity sensor to generate the latent load request.

12. The control system of claim 8, wherein the first capacity is greater than the second capacity.

13. The control system of claim 8, wherein the controller is configured to alternate between commanding the plurality of compressors to the first capacity based on the latent load request for the first predetermined time and commanding the plurality of compressors to the second capacity based on the sensible load request for the second predetermined time.

14. A method for controlling an output for a plurality of compressors comprising:
receiving, by a controller, a first value from a first sensor;
generating, by the controller, a first output from the first value;
receiving, by the controller, a second value from a second sensor;
generating, by the controller, a final output from the first output and the second value;
staging the plurality of compressors based on one of the first output and the final output;
controlling, by the controller, the plurality of compressors to a first capacity based on the first output for a first predetermined time; and
controlling, by the controller, the plurality of compressors to a second capacity based on the final output for a second predetermined time, wherein the second capacity is greater than the first capacity.

15. The method of claim 14, further comprising receiving, by the controller, a temperature from a temperature sensor as the first value, a sensible load request from a sensible load algorithm as the first output and a relative humidity from a humidity sensor as the second value.

16. The method of claim 15, further comprising determining, by the controller, a latent load request as the final output and modifying, by the controller, the sensible load request based on the relative humidity to derive the latent load request.

17. The method of claim 16, further comprising commanding the plurality of compressors to provide a capacity to meet an increased load corresponding to an increased stage from the sensible stage to overcool an environment and reduce relative humidity.

18. The method of claim 14, wherein a configuration of the plurality of compressors has a uniform distribution of stages.

19. The method of claim 14, wherein a configuration of the plurality of compressors has a non-uniform distribution of stages.

20. The control system of claim 8, wherein the controller is configured to generate the sensible load request based on a first value from a first sensor, and the controller is configured to generate the latent load request based on the sensible load request and a second value from a second sensor.

21. The control system of claim 20, wherein a temperature from a temperature sensor is the first value, and a relative humidity from a humidity sensor is the second value.

22. The control system of claim 20, wherein the controller is configured to stage the plurality of compressors based on one of the sensible load request and the latent load request.

23. The control system of claim 22, wherein a configuration of the plurality of compressors has a uniform distribution of stages.

24. The control system of claim 22, wherein a configuration of the plurality of compressors has a non-uniform distribution of stages.

25. The control system of claim 20, wherein the controller is configured to command the plurality of compressors to a sensible stage based on the sensible load request.

26. The control system of claim 25, wherein the controller is configured to command the plurality of compressors to provide a capacity to meet an increased load corresponding to an increased stage from the sensible stage to overcool an environment and reduce relative humidity.

* * * * *